United States Patent
Chen

(10) Patent No.: US 6,561,042 B1
(45) Date of Patent: May 13, 2003

(54) MULTI-PHASE FLOWS MEASUREMENT APPARATUS AND METHOD

(75) Inventor: Yaosheng Chen, 200 Country Club Dr. Bldg. D, Blacksburg, VA (US) 24060

(73) Assignee: Yaosheng Chen, Blacksburg, VA (US)

( * ) Notice: Subject to any disclaimer, the term of this patent is extended or adjusted under 35 U.S.C. 154(b) by 0 days.

(21) Appl. No.: 10/043,070

(22) Filed: Dec. 27, 2001

(51) Int. Cl.⁷ .................................................. G01F 1/74
(52) U.S. Cl. .................................................. 73/861.04
(58) Field of Search ......................... 73/861.04, 861.33, 73/861.77, 861.79, 861.81, 861.08, 195, 197, 53.01, 772; 95/254; 558/33; 165/111; 237/7; 166/250.15

(56) References Cited

U.S. PATENT DOCUMENTS

| | | | | |
|---|---|---|---|---|
| 3,931,273 A | * | 1/1976 | Lanteri ........................ 558/33 |
| 4,106,559 A | * | 8/1978 | Ritland et al. ............... 165/111 |
| 4,337,893 A | * | 7/1982 | Flanders et al. ................ 237/7 |
| 5,090,240 A | * | 2/1992 | Baker et al. .................. 73/197 |
| 5,107,209 A | * | 4/1992 | Kondo ........................ 324/772 |
| 5,337,615 A | * | 8/1994 | Goss ........................ 73/861.33 |
| 5,553,484 A | * | 9/1996 | Bender et al. ............. 73/53.01 |
| 5,660,617 A | * | 8/1997 | Hatton ........................ 95/254 |
| 6,412,351 B1 | * | 7/2002 | Zunft ....................... 73/861.04 |
| 6,454,002 B1 | * | 9/2002 | Stokes et al. .......... 166/250.15 |

* cited by examiner

Primary Examiner—Hezron Williams
Assistant Examiner—Jewel Thompson

(57) ABSTRACT

The present invention provides a method and apparatus for the real-time measurement of volumetric flow rates of the water/oil/gas fractions of a multiphase (water/oil/gas) flow in a pipe without the requirement of the separation of the gas and liquids. A number of material property sensors, multiphase flow-rate sensors, and temperature sensors are utilized. The water, oil or gas properties in a small region are determined instantaneously by a number of material property sensors based on the viscosity differences of the individual phases of the multiphase fluid at a certain temperature. Adding the volumetric flow fractions of the same phases in the small regions, the volumetric flow of the individual phases of the multiphase flow during a known time interval can be obtained.

22 Claims, 2 Drawing Sheets

— 1 —

MULTI-PHASE FLOWS MEASUREMENT APPARATUS AND METHOD

FIELD OF INVENTION

This invention relates to a method and an apparatus for the real-time measurement of volumetric flows that comprise more than one discrete phase. In particular, the present invention relates to a method and an apparatus for the real-time measurement of two phase or three phase flows from hydrocarbon wells without the requirement of separating the gas, liquids and solids, and without the use of impellers or other similar systems.

BACKGROUND OF THE INVENTION

In the oil industry, the measurement of multiphase flow is routinely encountered. For example, in order to assess exactly how much oil is being produced, or to improve or restore the productivity of a well, it is required to determine the volumetric flow rates of the individual phases of the material obtained from the well at times throughout the life of the well. A number of methods to measure multiphase flow have been proposed, and they fall into two types. In the first method, a sample of the oil flow is transferred to separators, and the volumes of each phase are determined independently. The problems associated with this method are that a large physical installation is required and that the instantaneous determination of flow is impossible. This specifically limits the analysis of the instantaneous production from a well, or of the volumes of each phase transmitted from the oil fields or offshore sites to the refinery. The second method involves the use of microwave energy, or γ-ray radiation, to perform full flow measurement. The microwave and γ-ray methods are useful only for homogeneous multiphase fluids. However, the relative volumes of each phase, and the fluid flow rate can both vary considerably as a function of time. As a result, it has been proven that microwave and γ-ray methods are not suitable for the measurement of multiphase fluid flow.

SUMMARY OF THE INVENTION

It is an object of the present invention to provide a method and apparatus capable of the real-time measurement of volumetric flow rates of different phases in a multiphase fluid flow.

It is another object of the invention to provide a method and apparatus that requires no separate means to determine the volume fraction of the phases of the material in the flow in order to determine the volumetric flow rate.

It is a further object of the invention to provide a method and apparatus that requires no impellers or similar systems to homogenize the flowing multiphase fluid in order to determine the volumetric flow rate of the individual phases.

It is still a further object of the invention to provide a method and apparatus that requires no radiation sources, such as microwave or γ-ray, in order to determine the volumetric flow rate of the individual phases.

These and other objects are achieved according to the present invention by providing a novel apparatus and method for the real-time measurement of the flow rate of each separate phase of a multiphase fluid consisting of gas, water and oil. Said apparatus consists of a number of material property (i.e., water, gas, or oil) sensors, temperature sensors, and flow-rate sensors mounted inside a pipe used to transmit the flow. By combining the individual volume fractions of the separate phases with the flow data, the volumetric flow rates of the individual phases in the multiphase fluid are obtained.

BRIEF DESCRIPTION OF THE DRAWINGS

The present invention may be best understood by way of the following description of a method employing the principles of the invention as illustrated in the accompanying drawings, in which.

REFERENCE NUMERALS IN DRAWINGS

Figure 1:
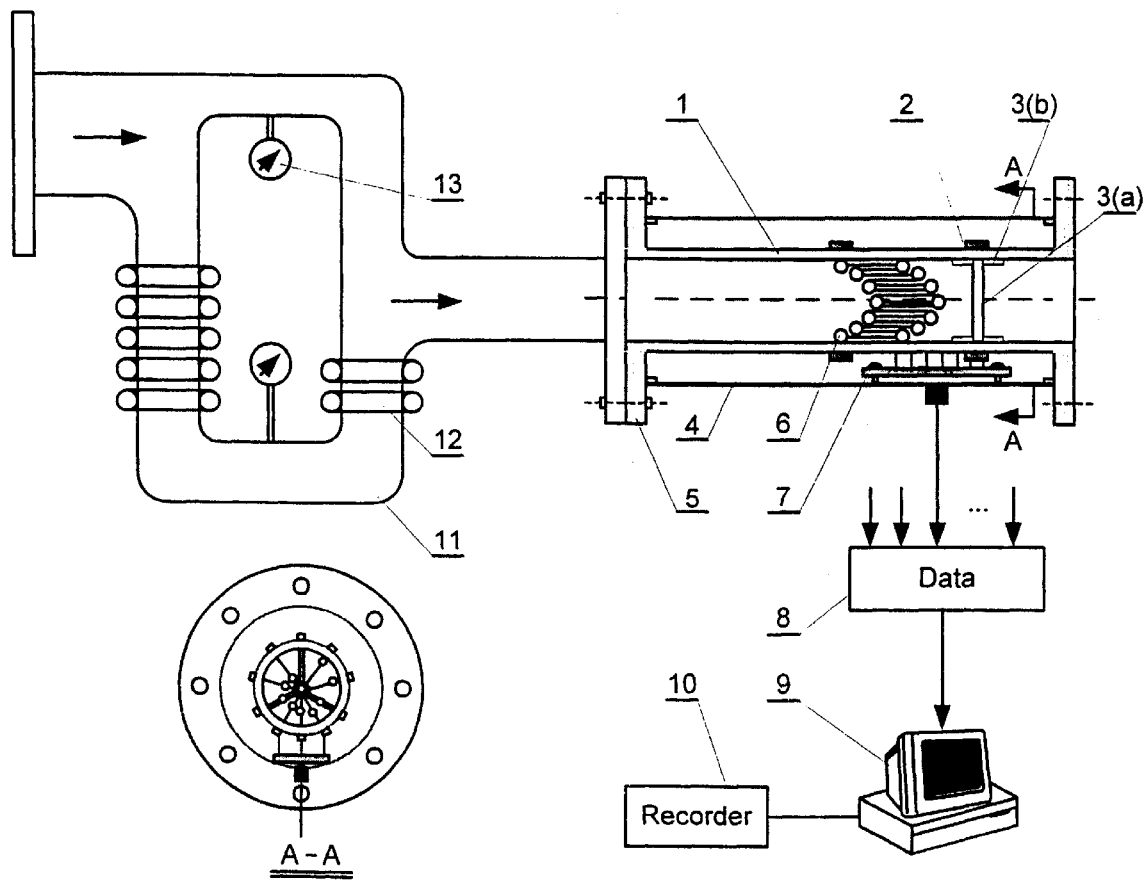
FIG. 1 is a graphical representation of the apparatus.

1. Pipe
2. Sensor support
3a. Flow rate sensor for the fluid flowing along the center of a pipe
3b. Flow rate sensor for the fluid flowing along the edge of a pipe
4. Protective housing
5. Ring flange
6. Material property sensors
7. Electronic circuit
8. Data collector
9. Data processing
10. Recorder
11. Fluids collecting and conveyance pipe
12. Heater
13. Pressure gauge
14. Spring plate
15. Light input optical fiber
16. Light output optical fiber
17. Support
18. Light source
19. Photoelectric detector
20. Signal processing
21. Signal output

DETAILED DESCRIPTION

One of the advantages of the method of the present invention is that it is suitable for use for any type of multiphase fluid flow, no matter what the flow conditions, i.e., the material distribution conditions within the flow (homogeneous or inhomogeneous), laminar-flow or turbulent flow, two-phase flow or multiphase flow.

The present invention utilizes a number of fiber optic sensors to measure specific engineering parameters, and the fundamental principles of viscosity to determine the material property (i.e., oil, water or gas) in a small region. Viscosity is related to other properties by $$\eta = (F/S)(dv/dr) \qquad (1)$$

where $\eta$ is the viscosity coefficient, F/S is the interfacial coefficient of friction, dr is the incremental distance at the interface between two layers of fluids, and dv is the change in the flow rate over the distance dr. At a given temperature, the material property of any substance can be determined solely by its viscosity.

The present invention also utilizes a number of strain sensors to determine the instantaneous flow rates of the multiphase fluid flow. Said strain sensors are mounted at different locations with respect to the flow to determine the flow rates in the center and the edge areas, the flow rates at other locations in the flow and the radial distribution of the flow rates of the multiphase fluid flow in the pipe. The total flow volume, or flux Q, for an ideal fluid ($\eta=0$) over a short time interval t for flow in a cylindrical pipe of radius r can be obtained by $$Q = \pi r^2 v t, \qquad (2)$$

where v is the flow rate.

For the case of a multiphase fluid flow, if a certain volume of fluid with a length l along the pipe is considered, the viscosity of each material component is not zero. If said volume of a multiphase flow is divided into a large enough number of smaller volumes, the material properties and the volumetric flows of the individual phases (or the ratio of the percentages of the components) of the multiphase fluid flow in each small incremental volume over a short time interval may be determined by a discrete material property sensor. Integrating all the volume fractions with the same phases throughout the flow, and matching the flow rate with the measurement sampling time, the volumetric flow rate of each phase in a multiphase fluid flow, and thus the volumetric flow rate of all the phases in a multiphase fluid flow, can be obtained.

The measurement accuracy is a function of the sampling frequency in that the higher the sampling frequency, the more accurate the measurement. Similarly, the flow volume of each composition, i.e. the flux $Q_{water}$ of water, the flux $Q_{oil}$ of oil, and the flux $Q_{gas}$ of gas, over said time interval t can be determined.

In general, there is an oil collection station for every several oil wells, which transmits oil from the oil fields to a refinery or other destinations. Each oil collection station thus requires at least one multiphase fluid flow measurement system. Additionally, for each oil well, in order to determine reservoir and production information, at least one multiphase fluid flow measurement system is required. Further, within the structure of each well, such multiphase flow devices are needed to determine and discriminate between the sources of oil, gas and water.

One of the preferred embodiments of the assembly structure of the apparatus is shown in FIG. 1. All the sensors are mounted inside a pipe 1. Said pipe 1 has a length of about 1 m and an inner diameter of about 0.1–0.2 m. A flow rate sensor 3a for the measurement of the flow in the central area of the pipe, and a temperature sensor T, are mounted on a sensor support 2. The flow rate sensors 3b for the measurement of the flow in the edge areas of the pipe are also assembled on said sensor support 2, oriented parallel to the flow direction. If, for example, six material property sensors 6 are used, the distances from the wall of the pipe at which they are inserted into holes in another sensor support are 0, 1/6 r, 2/3 r, 1/2 r, 2/3 r, 5/6 r, and r, respectively, where r is the inner radius from the cross-sectional view of A—A in FIG. 1. Said six material property sensors form a parabolic distribution pattern in the plane of the cross-section of the pipe. The photoelectric conversion and detector, as well as the microprocessor, are mounted in protective housing 4. Said protective housing 4 is a cylinder with a thickness of about 1 mm between its outer layer and its inner layer.

In order to have the pipe 1 filled with the fluid when the flow rate is low, a fluid collecting and conveyance pipe 11 may be further employed and connected with the pipe 1 through a ring flange 5. The apparatus may further comprise of a heater 12, for example, a hot water pipe used to heat the fluid by surrounding part of said fluid collecting and conveyance pipe 11. A pressure gauge 13 is provided to allow the operator to judge the flow state.

The flow rate sensors are formed using a stainless steel pipe with a radius of about 1 mm, in which an optical fiber is placed. Said optical fiber is cut into two parts in the middle, and said two parts of the optical fiber are set apart by an axial separation distance of about 0.3–0.5 mm. Because the flowing fluid produces vibration, and the vibration amplitude is proportional to flow rate, the flow rate can be determined by directly measuring the vibration induced changes in the optical intensity coupled between the two fiber segments, caused by the flowing fluid. A flow rate sensor 3a used to measure the flow of the fluid flowing along the center of a pipe is mounted in the geometric center and across the pipe, while flow rate sensors 3b for the fluid flowing along the edges of a pipe are assembled on the inner wall of the pipe. Thus, the derivative of the flow rate with respect to the radius, dv/dr, can be calculated. Temperature sensors can be assembled with said flow rate sensors by coating temperature-sensitive films on the end surfaces of the optical fibers, where said space between the two cut optical fibers has been set. The number of output pulses per time segment is proportional to the value of the flow rate, and the amplitudes of said output pulses are proportional to the temperature. As an alternative, the temperature sensors can be fabricated by other conventional methods and placed outside the flow rate sensors.

Figure 2:
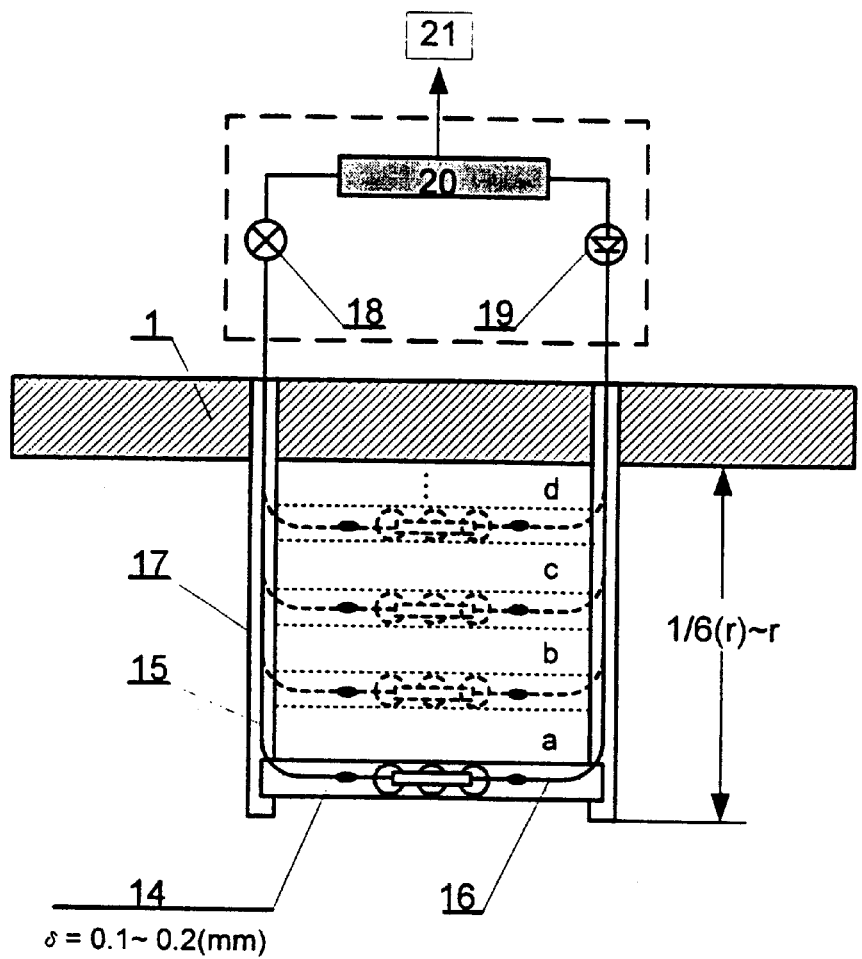
FIG. 2 shows a viscosity sensor.
Figure 2:
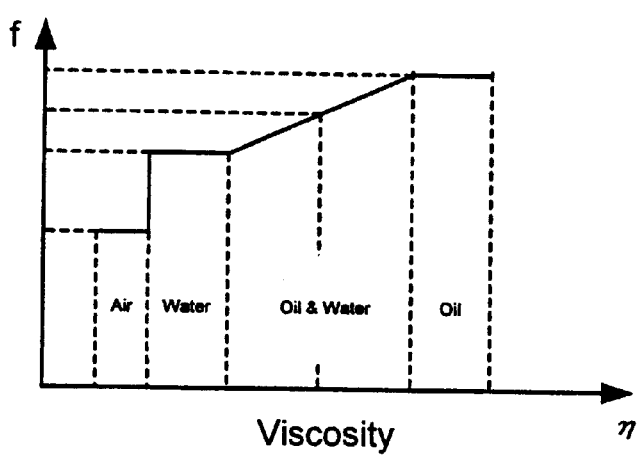

One example of said material property sensors 6 used to determine the material properties (i.e., oil, water, or gas) is shown in more detail in FIG. 2. Numeral 14 stands for a spring with a thickness of about 0.1–0.2 mm. Input optical fiber 15 and output optical fiber 16 are coupled together with an air gap of about 0.1–1 mm. Parts of said input optical fiber 15 and output optical fiber 16 are mounted on said spring plate 14 by glue, fusion or other methods. Numeral 17 represents a support to hold the sensors. A light source 18 is connected with the input optical fiber 15, and a photoelectric detector 19 is coupled with the output optical fiber 16. Numerals 20 and 21 represent pre-amplified signals and output signals, respectively. The dotted lines in FIG. 2 indicate that a number of material property sensors can be mounted on a single support, or assembled separately as shown in FIG. 1. Due to the fluid viscosity, when the fluid passes the spring and the optical fibers, the spatial distribution of flow rate, the friction between the fluid and the spring, as well as the friction between the fluid and the optical fibers, cause deformation of the spring plate and the micro-displacement of the air gap between the input and output optical fibers, thus different output optical frequency signals corresponding to the material properties of the multiphase fluid can be determined, as shown in FIG. 2. The material property sensors can also be made with piezoelectric films using conventional forming techniques or the ESA (electrostatic self-assembly) method, where two wires are used as input and output leads. Due to the flowing fluid, internal friction among the layers and the spatial distribution of the flow rate cause the deformation of the thin spring plate coated with the piezoelectric films, producing electric output signals with frequencies related to the material properties.

In order to increase the measurement accuracy, the volume of every sensor should be as small as possible, and the sampling frequency should be as high as possible. The supports for the sensors should have a small size, small radius and a special shape (for example, that of a comb) to reduce the resistance to the flow. One example of the support is a stainless steel pipe with a radius of about 3 mm.

While the present invention has been described with particular reference to preferred embodiments, the protection sought is to be limited only by the terms of the claims that follow.

I claim:

1. A method for measuring in real-time a volumetric flow rate for each component of a multicomponent multiphase fluid in a pipe, comprising:

for each of a plurality of contiguous radially-distributed volumes of the fluid, determining a component within the contiguous radially-distributed volume;

for each of the contiguous radially-distributed volumes, determining a flowrate;

for each component, summing the flowrates for all contiguous radially-distributed volumes having the component to arrive at a total flowrate for the component.

2. The method of claim 1, further comprising measuring a central volume flowrate and an edge volume flowrate for the fluid.

3. The method of claim 1, further comprising calculating a radial flowrate distribution for the fluid.

4. The method of claim 1, further comprising differentiating a central volume flowrate and an edge volume flowrate for the fluid to obtain a radial flowrate distribution for the fluid.

5. The method of claim 1, further comprising differentiating a central volume flowrate and an edge volume flowrate for the fluid to obtain a plurality of radially-distributed volume flowrates.

6. The method of claim 1, further comprising differentiating a central volume flowrate and an edge volume flowrate for the fluid to obtain a flowrate for each of the plurality of contiguous radially-distributed volumes.

7. The method of claim 1, further comprising heating the fluid.

8. The method of claim 1, further comprising heating the fluid prior to determining a component within each contiguous radially-distributed volume of the fluid.

9. A system for measuring in real-time a volumetric flow rate for each component of a multicomponent multiphase fluid in a pipe, comprising:
  a plurality of component detectors, each of which, in an operative configuration, is adapted to detect a component within a corresponding one of a plurality of contiguous radially-distributed volumes of the multicomponent multiphase fluid;
  a plurality of flow rate sensors, each of which, in an operative configuration, is adapted to sense a flow rate of a component within a corresponding one of the plurality of contiguous radially-distributed volumes of the multicomponent multiphase fluid;
  a processor that, in an operative configuration, is in communication with said plurality of component detectors and said plurality of flow rate sensors, and is adapted to process the component detections and the flow rates to determine a total flowrate for each component in the multicomponent multiphase fluid.

10. The system of claim 9, further comprising a fluid temperature sensor, that, in an operative configuration, is adapted to sense a temperature of the multicomponent multiphase fluid, said fluid temperature sensor in communication with said processor.

11. The apparatus of claim 9, further comprising a fluid temperature sensor, that, in an operative configuration, is adapted to sense a temperature of the multicomponent multiphase fluid, said processor in communication with said fluid temperature sensor, and said processor, in an operative configuration, adapted to modify said flowrate for each component in the multicomponent multiphase fluid based upon the temperature of the multicomponent multiphase fluid.

12. The system of claim 9, further comprising a fluid temperature sensor, that, in an operative configuration, is adapted to sense a temperature of the multicomponent multiphase fluid, said processor in communication with said fluid temperature sensor, and said processor, in an operative configuration, adapted to modify said total flowrate for each component in the multi component multiphase fluid based upon the temperature of the multicomponent multiphase fluid.

13. The system of claim 9, further comprising a heater that, in an operative configuration, is adapted to heat the fluid.

14. The system of claim 9, further comprising a heater that, in an operative configuration, is adapted to heat the fluid prior to a detection of a component of the multicomponent multiphase fluid.

15. The system of claim 9, wherein said processor, in an operative configuration, is adapted to determine a radial distribution of flow rates within the fluid.

16. The system of claim 9, wherein said processor, in an operative configuration, is adapted to determine a radial distribution of flow rates within the fluid, the radial distribution corresponding to the plurality of contiguous radially-distributed volumes of the multicomponent multiphase fluid.

17. The system of claim 9, wherein at least one of said plurality of flow rate sensors is located in a central region of the pipe.

18. The system of claim 9, wherein at least one of said plurality of flow rate sensors is located in an edge region of the pipe.

19. A system for measuring in real-time a volumetric flow rate for each component of a multicomponent multi phase fluid in a pipe, comprising:
  a plurality of component determining means, each for determining a component within a corresponding one of a plurality of contiguous radially-distributed volumes of the multicomponent multiphase fluid;
  a plurality of flow rate measurement means, each for measuring a flow rate of a component within a corresponding one of the plurality of contiguous radially-distributed volumes of the multi component multiphase fluid;
  a processor that, in an operative configuration, is in communication with said plurality of component determining means and said plurality of flow rate measurement means, and is adapted to process the component determinations and the flow rates to determine a total flowrate for each component in the multicomponent multiphase fluid.

20. A system for measuring in real-time a volumetric flow rate for each component of a multicomponent multiphase fluid in a pipe, comprising:
  for each of a plurality of predetermined contiguous radially-distributed volumes of the fluid, a component detector that, in an operative configuration, is adapted to detect a component within the volume;
  for each of the predetermined contiguous radially-distributed volumes, a flowrate sensor that, in an operative configuration, is adapted to sense a flow rate of a component within the volume;
  a processor that, in an operative configuration, is adapted to, for each component, sum the flowrates for all predetermined contiguous radially-distributed volumes having the component to arrive at a total flowrate for the component.

21. A system for measuring in real-time a volumetric flow rate for each component of a multicomponent multiphase fluid in a pipe, comprising:
  for each of a plurality of contiguous radially-distributed volumes of the fluid, means for determining a component within the contiguous radially-distributed volume;
  for each of the contiguous radially-distributed volume, means for determining a flowrate;
  for each component, means for summing the flowrates for all contiguous radially-distributed volumes having the component to arrive at a total flowrate for the component.

22. A computer-readable medium containing instructions for activities comprising:

for each of a plurality of contiguous radially-distributed volumes of the fluid, determining a component within the contiguous radially-distributed volume; for each of the contiguous radially-distributed volume, determining a flowrate;

for each component, summing the flowrates for all contiguous radially-distributed volumes having the component to arrive at a total flowrate for the component.

* * * * *